US011216761B2

(12) United States Patent
Mantryvong

(10) Patent No.: US 11,216,761 B2
(45) Date of Patent: Jan. 4, 2022

(54) SYSTEM AND METHOD FOR SUPPLY CHAIN OPTIMIZATION

(71) Applicant: SOCIÉTÉ ENKIDOO TECHNOLOGIES, Montréal (CA)

(72) Inventor: Pholysa Mantryvong, Montreal (CA)

(73) Assignee: SOCIETE ENKIDOO TECHNOLOGIES, Montreal (CA)

( * ) Notice: Subject to any disclaimer, the term of this patent is extended or adjusted under 35 U.S.C. 154(b) by 0 days.

(21) Appl. No.: 16/506,523

(22) Filed: Jul. 9, 2019

(65) Prior Publication Data
US 2020/0012984 A1    Jan. 9, 2020

Related U.S. Application Data

(60) Provisional application No. 62/695,470, filed on Jul. 9, 2018.

(51) Int. Cl.
*G06Q 10/06* (2012.01)
*G06N 5/04* (2006.01)
*G06F 40/20* (2020.01)

(52) U.S. Cl.
CPC ....... *G06Q 10/06315* (2013.01); *G06F 40/20* (2020.01); *G06N 5/04* (2013.01)

(58) Field of Classification Search
CPC .......... G06Q 10/00–50/00; G06N 3/00–20/00; G06F 1/00–21/00
USPC ............................................... 705/7.11–7.42
See application file for complete search history.

(56) References Cited

U.S. PATENT DOCUMENTS

| | | | | |
|---|---|---|---|---|
| 6,577,304 B1* | 6/2003 | Yablonski | ............... | G06Q 10/06 345/419 |
| 6,671,673 B1* | 12/2003 | Baseman | ............... | G06Q 10/06 705/7.26 |
| 6,947,905 B1* | 9/2005 | Starr | ...................... | G06Q 10/06 705/37 |
| 8,078,485 B1* | 12/2011 | Kraehmueller | ...... | G06Q 10/063 705/7.11 |
| 8,412,741 B2* | 4/2013 | Hein | ...................... | G06F 16/25 707/797 |
| 8,615,481 B1* | 12/2013 | Pragada | ................ | G06F 16/951 706/50 |
| 2003/0225634 A1* | 12/2003 | Skibinski | ............. | G06Q 10/087 705/28 |
| 2003/0225720 A1* | 12/2003 | Farlow | .................. | G06F 16/972 706/50 |

(Continued)

*Primary Examiner* — Alan S Miller
(74) *Attorney, Agent, or Firm* — Norton Rose Fulbright Canada LLP

(57) ABSTRACT

A supply chain optimization method and system for at least one supply chain entity are provided. Input data related to a supply chain to be optimized is collected in real-time. A decision problem specific to and supply chain parameter(s) to be optimized for the at least one supply chain entity are inferred in real-time from the input data. A conversational user interface is used to query the user in real-time in order to gather additional supply parameter(s) to be optimized and a natural language input is received in real-time, via the conversational user interface, in response to the query. The natural language input is parsed in real-time to gather the additional supply chain parameter(s) and a solution to the decision problem is output based on the additional optimization parameter(s).

17 Claims, 5 Drawing Sheets

(56) References Cited

U.S. PATENT DOCUMENTS

| | | | |
|---|---|---|---|
| 2003/0233339 A1* | 12/2003 | Downs | G06Q 30/02 |
| 2004/0015543 A1* | 1/2004 | Schmidt | G06Q 10/10 709/203 |
| 2004/0064351 A1* | 4/2004 | Mikurak | G06Q 10/087 705/22 |
| 2006/0250248 A1* | 11/2006 | Tu | G06Q 10/06 340/572.4 |
| 2007/0094063 A1* | 4/2007 | Skibinski | G06Q 10/06 705/7.37 |
| 2007/0203810 A1* | 8/2007 | Grichnik | G06Q 10/087 705/28 |
| 2008/0015721 A1* | 1/2008 | Spearman | G06Q 10/087 700/99 |
| 2009/0288051 A1* | 11/2009 | Hemmett | G06F 30/3312 716/113 |
| 2010/0010968 A1* | 1/2010 | Redlich | G06Q 10/00 707/E17.014 |
| 2011/0230994 A1* | 9/2011 | Spearman | G06Q 10/06 700/99 |
| 2012/0035984 A1* | 2/2012 | Gorur Narayana Srinivasa | G06Q 30/0206 705/7.35 |
| 2013/0138470 A1* | 5/2013 | Goyal | G06Q 10/103 705/7.26 |
| 2014/0019471 A1* | 1/2014 | Linton | G06F 16/242 707/759 |
| 2014/0058775 A1* | 2/2014 | Siig | G06Q 10/06 705/7.12 |
| 2014/0337083 A1* | 11/2014 | Goyal | G06Q 10/103 705/7.25 |
| 2015/0088596 A1* | 3/2015 | Civil | G06Q 10/0635 705/7.28 |
| 2015/0143258 A1* | 5/2015 | Carolan | G06F 3/0488 715/752 |
| 2017/0017909 A1* | 1/2017 | Srinivasan | G06Q 10/06315 |
| 2017/0039500 A1* | 2/2017 | Leidner | G06F 16/951 |
| 2017/0103329 A1* | 4/2017 | Reddy | G06Q 30/016 |
| 2018/0069899 A1* | 3/2018 | Lang | G06F 8/38 |
| 2018/0082183 A1* | 3/2018 | Hertz | G06Q 10/10 |
| 2018/0129646 A1* | 5/2018 | Heck | G06F 40/35 |
| 2018/0150758 A1* | 5/2018 | Niininen | G06N 20/00 |
| 2018/0349474 A1* | 12/2018 | Smith | G06Q 10/06 |
| 2020/0012984 A1* | 1/2020 | Mantryvong | G06F 40/205 |

* cited by examiner

SYSTEM AND METHOD FOR SUPPLY CHAIN OPTIMIZATION

CROSS REFERENCE TO RELATED APPLICATIONS

This patent application claims priority of U.S. provisional Application Ser. No. 62/695,470, filed on Jul. 9, 2018, the entire contents of which are hereby incorporated by reference.

TECHNICAL FIELD

The application relates generally to supply chain optimization.

BACKGROUND OF THE ART

A supply chain is a network of facilities that involve a large number of parts and products. The supply chain performs the functions of procuring materials, transforming the materials into semi-finished and finished products, and distributing the finished products to customers.

Increased attention is nowadays placed on the performance, design, and analysis of the supply chain and supply chain optimization is often used to ensure the optimal operation of a supply chain. In particular, supply chain optimization aims at minimizing total supply chain costs while meeting customer requirements. Due to the advances in computer technology, supply chain optimization typically involves applying mathematical modelling and programming techniques using computer software.

Because a solution generated by a given optimization model will be no better than the inputs received by the model, existing computer-based supply chain optimization techniques require large quantities of data to be collected in order to create a suitable optimization model. The data collection step is typically performed using a variety of data collection systems, such as by a user filling out lengthy forms or by having a consultant ask the user specific questions to narrow down the analysis. This however proves cumbersome and time consuming, in addition to requiring significant computational resources. In addition, the user may be asked questions that are not applicable to their specific situation. Also, the user might not always be aware what constraints are applicable to their specific situation, thus complicating the data collection process when done using forms. In addition, several stages of data and model validation are generally required until sufficient accuracy is achieved, thus increasing complexity and computational time.

Therefore, there is a need for improved methods and systems for performing supply chain optimization.

SUMMARY

In one aspect, there is provided a computer-implemented method for optimizing a supply chain for at least one supply chain entity. The method comprises collecting in real-time, by a computer system, input data related to the supply chain to be optimized, using an inference engine of the computer system to infer in real-time, from the input data, a decision problem specific to the at least one supply chain entity and one or more supply chain parameters to be optimized for the at least one supply chain entity, using a conversational user interface of the computer system to query a user in real-time in order to gather one or more additional supply chain parameters to be optimized for the at least one supply chain entity, receiving in real-time, via the conversational user interface, a natural language input in response to the query, parsing, by the computer system, the natural language input in real-time to gather the one or more one or more additional supply chain parameters, and outputting, by the computer system, based on the one or more additional supply chain parameters, a solution to the decision problem.

In some embodiments, collecting the input data in real-time comprises connecting in real-time to at least one of an Enterprise Resource Planning (ERP) system, a financial system, an e-commerce system, a ticket support system, and an email system associated with the at least one supply chain entity, and automatically collecting the input data therefrom in real-time.

In some embodiments, the input data is collected in real-time by crawling in real-time a plurality of webpages associated with the at least one supply chain.

In some embodiments, using the inference engine to infer the one or more supply chain parameters comprises using a predictive classification model to determine a context of textual content contained in the input data, infer from the context one or more features relevant to the supply chain to be optimized, and determine the one or more supply chain parameters accordingly.

In some embodiments, the method further comprises using the computer system to query a memory to retrieve therefrom one or more existing projects, correlate the input data with the one or more existing projects, and responsive to determining that none of the one or more existing projects match the input data, use the conversational user interface to query the user in order to gather the one or more additional supply chain parameters.

In some embodiments, the method further comprises using the computer system to determine optimization parameters not explicitly provided in the input data and identify the one or more optimization parameters as the one or more additional supply chain parameters, use machine learning techniques to determine a reduced set of questions to be answered by the user to collect the one or more additional supply chain parameters, and use the conversational user interface to query the user with the reduced set of questions in real-time in order to gather the one or more additional supply chain parameters.

In some embodiments, the method further comprises using the computer system to establish in real-time, based on the input data, the one or more supply chain parameters, and the one or more additional supply chain parameters, at least one optimization model applicable to solve the decision problem, and carry out an optimization process using the at least one optimization model to generate the solution to the decision problem.

In some embodiments, the method further comprises using the computer system to perform post-processing on the solution by at least one of validating results of the optimization process for self-consistency, performing parameter sensitivity, and annotating and justifying the optimization process.

In some embodiments, outputting the solution comprises feeding the solution to an Enterprise Resource Planning (ERP) system via one or more Application programming interface (API) calls.

In another aspect, there is provided a system for optimizing a supply chain for at least one supply chain entity. The system comprises a processing unit and a non-transitory computer-readable memory having stored thereon program instructions executable by the processing unit for collecting, in real-time, input data related to the supply chain to be optimized, inferring in real-time, from the input data, a decision problem specific to the at least one supply chain entity and one or more supply chain parameters to be optimized for the at least one supply chain entity, using a conversational user interface to query a user in real-time in order to gather one or more additional supply chain to be optimized for the at least one supply chain entity, receiving in real-time, via the conversational user interface, a natural language input in response to the query, parsing the natural language input in real-time to gather the one or more one or more additional supply chain parameters, and outputting, based on the one or more additional supply chain parameters, a solution to the decision problem.

In some embodiments, the program instructions are executable by the processing unit for collecting the input data in real-time comprising connecting in real-time to at least one of an Enterprise Resource Planning (ERP) system, a financial system, an e-commerce system, a ticket support system, and an email system associated with the at least one supply chain entity, and automatically collecting the input data therefrom in real-time.

In some embodiments, the program instructions are executable by the processing unit for collecting the input data in real-time by crawling in real-time a plurality of webpages associated with the at least one supply chain.

In some embodiments, the program instructions are executable by the processing unit for using the inference engine to infer the one or more supply chain parameters comprising using a predictive classification model to determine a context of textual content contained in the input data, infer from the context one or more features relevant to the supply chain to be optimized, and determine the one or more supply chain parameters accordingly.

In some embodiments, the program instructions are executable by the processing unit for querying a memory to retrieve therefrom one or more existing projects, correlating the input data with the one or more existing projects, and responsive to determining that none of the one or more existing projects match the input data, using the conversational user interface to query the user in order to gather the one or more additional supply chain parameters.

In some embodiments, the program instructions are executable by the processing unit for determining optimization parameters not explicitly provided in the input data and identify the one or more optimization parameters as the one or more additional supply chain parameters, using machine learning techniques to determine a reduced set of questions to be answered by the user to collect the one or more additional supply chain parameters, and using the conversational user interface to query the user with the reduced set of questions in real-time in order to gather the one or more additional supply chain parameters.

In some embodiments, the program instructions are executable by the processing unit for establishing in real-time, based on the input data, the one or more supply chain parameters, and the one or more additional supply chain parameters, at least one optimization model applicable to solve the decision problem, and carrying out an optimization process using the at least one optimization model to generate the solution to the decision problem.

In some embodiments, the program instructions are executable by the processing unit for performing post-processing on the solution by at least one of validating results of the optimization process for self-consistency, performing parameter sensitivity, and annotating and justifying the optimization process.

In some embodiments, the program instructions are executable by the processing unit for outputting the solution comprising feeding the solution to an Enterprise Resource Planning (ERP) system via one or more Application programming interface (API) calls.

In yet another aspect, there is provided a non-transitory computer readable medium having stored thereon program code executable by a processor for optimizing a supply chain for at least one supply chain entity, the program code comprising instructions for collecting, in real-time, input data related to the supply chain to be optimized, inferring in real-time, from the input data, a decision problem specific to the at least one supply chain entity and one or more supply chain parameters to be optimized for the at least one supply chain entity, using a conversational user interface to query a user in real-time in order to gather one or more additional supply chain parameters in real-time to be optimized for the at least one supply chain entity, receiving in real-time, via the conversational user interface, a natural language input in response to the query, parsing the natural language input in real-time to gather the one or more one or more additional supply chain parameters, and outputting, based on the one or more additional supply chain parameters, a solution to the decision problem.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
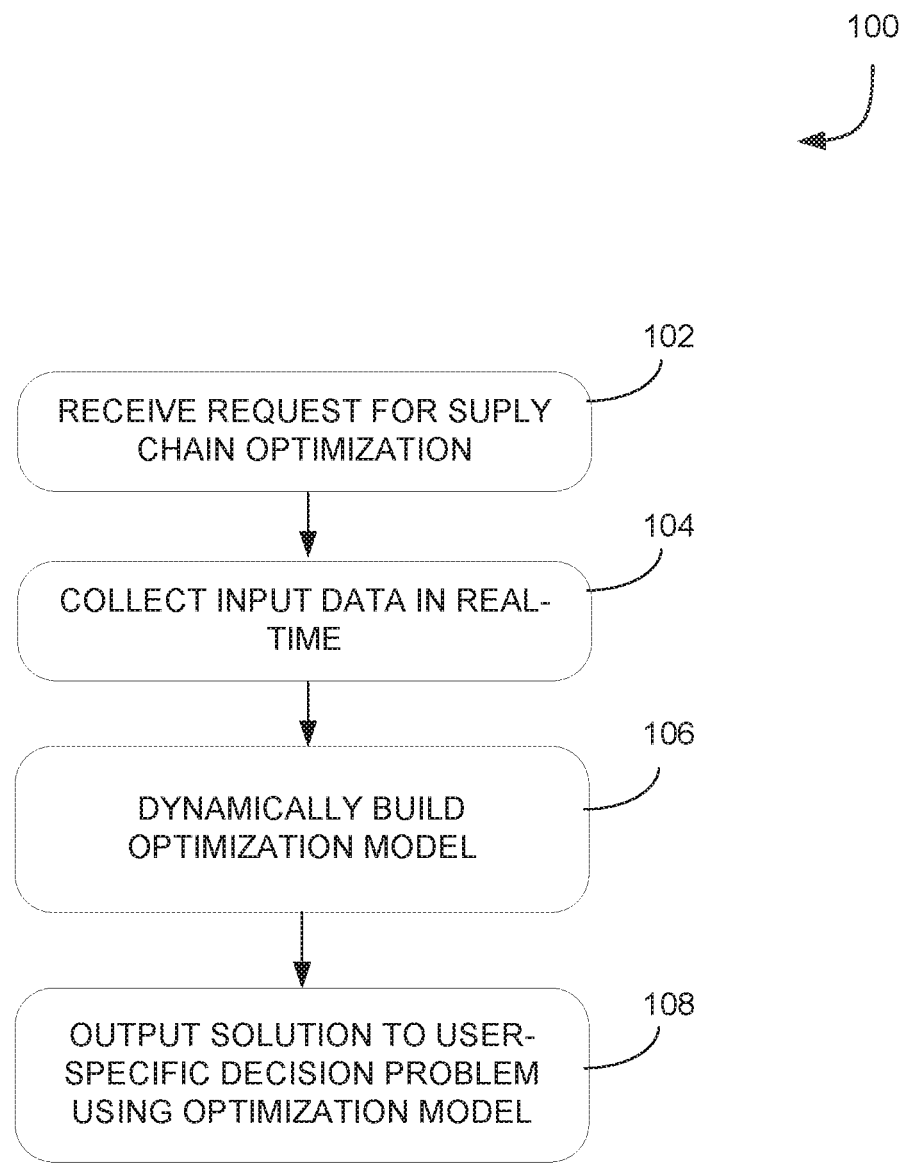
FIG. 1 is a flowchart of a method for supply chain optimization, in accordance with an illustrative embodiment.

Referring to FIG. 1, a method 100 for supply chain optimization in accordance with one embodiment will now be described. The method 100 may be used to manage and optimize supply chain operations for a given user (e.g. supply chain decision maker) and/or company (also referred to as a supply chain entity). As used herein, the term "supply chain optimization" refers to the use of a computer-based optimization model to identify a set of decisions or plans that can be pragmatically implemented (e.g. by the supply chain decision maker) to improve the performance of an entity's supply chain.

At step 102, a request for optimizing a given supply chain is received from the user. The request may be received via any suitable input means (e.g. a user interface) or communication means (e.g. via email). In response to the request being received, input data that uniquely identifies the user as well as data relevant to the supply chain to be optimized is collected in real-time at step 104. For example, the input data may include, but is not limited to, the name of the user, the supply chain entity whose supply chain is to be optimized, the geographic region the supply chain entity operates in, the supply chain entity's website, the industry the supply chain entity operates in, and the sector the supply chain entity operates in. In one embodiment, the data is provided by the user (e.g. via any suitable input or communication means) upon submission of the request. In another embodiment, the data is uploaded (e.g. as one or more Comma-separated values (CSV) files or in any other suitable format) by the user to an unstructured data storage.

In some embodiments, step 104 comprises connecting in real-time to Representational State Transfer (REST) Application programming interfaces (APIs) and/or one or more participating integrated systems (e.g. Enterprise Resource Planning (ERP) systems, financial systems, e-commerce systems, ticket support systems, and email systems), which are associated with the supply chain entity, in order to automatically collect the data. For example, transactional data (relating, for example, to manufacturing, logistics, finance, sales, and human resources) may be collected by accessing the supply chain entity's ERP system in real-time. The data relevant to the supply chain to be optimized and/or the supply chain entity can also be obtained by accessing the supply chain entity's email system. Email trails may for example be analyzed to find client conversations and/or look for potential complaints. The input data may also be collected dynamically by crawling company webpages in real time in order to gather textual content related to the supply chain to be optimized and accordingly perform company profiling. The data collected at step 104 is then processed and validated (e.g. by normalizing headers, catching missing fields, and validating data type).

The next step 106 is to dynamically build an optimization model. In one embodiment and as will be discussed further below, the optimization model is built by interacting with the user in real-time (e.g. using a conversational user interface) in order to determine decision problem(s) (referred to herein as a user-specific decision problem(s)) specific to at least one supply chain entity and gather all parameters needed to perform the optimization (i.e. gather constraints of the optimization model). As used herein, the term conversational interface (also referred to as a dialogue system or conversational agent) refers to an automated computer system configured to allow conversation with a human. The conversational interface engages in a dialog with a user, employing one or more of text, speech, or any other suitable mode of communication, as will be discussed further below. Depending on the aspects of the supply chain that are to be optimized, the necessary parameters may include setup costs, holding costs, and other economical, physical, or policy constraints. For example, when demand forecasting is to be optimized, the inventory holding cost of the company's items and the setup cost per order would have to be gathered. Once the optimization model is built, it is then used at step 108 to generate and output a solution to the user-specific decision problem to be solved in order to optimize the supply chain.

Figure 2:
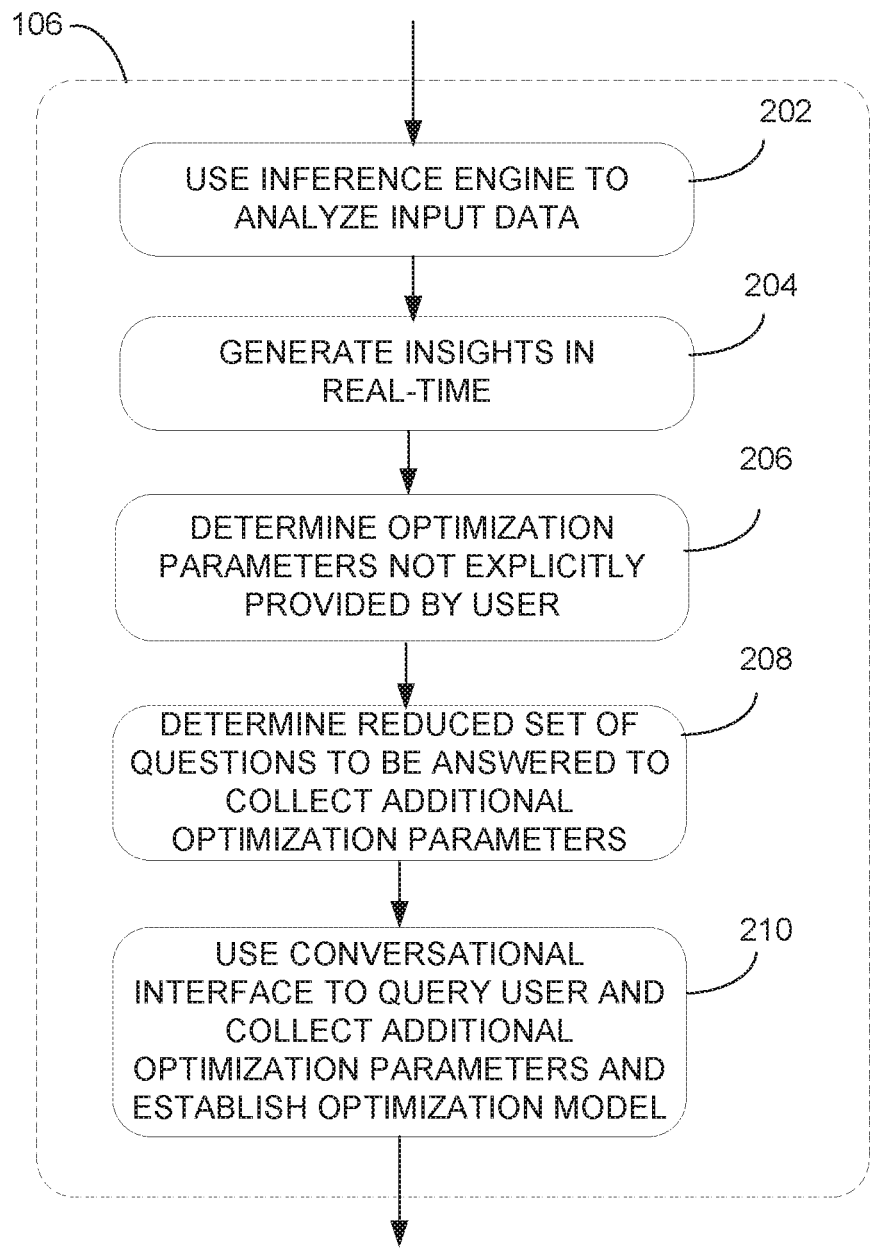
FIG. 2 is a flowchart of the step of FIG. 1 of dynamically building an optimization model.

Referring now to FIG. 2, the step 106 of dynamically building the optimization model comprises using an inference engine to analyze the input data at step 202. For this purpose, academic papers, white papers, and other publicly available documentation related to supply chain optimization are collected, labelled, and stored in memory or any other suitable computer-based storage device. A large amount (e.g., thousands) of documents are illustratively collected and processed at step 106 and this can be achieved through the use of computers. The collected documentation is then used to build and train, using a computer, a predictive classification model configured to infer, from the context of textual content, features relevant to the case at hand (also referred to herein as "features of interest"). The features may for instance comprise a sector (e.g. manufacturing, distribution, retail, etc.), an industry (e.g. fashion, furniture, etc.), models (e.g. demand planning heuristics, genetic algorithms, types of constraints associated with different situations, etc.), and the like. In one embodiment, the inference engine performs statistical analysis of the textual content contained in the input data received at step 104 in order to infer the features of interest. For instance, at step 202, the analysis of the files uploaded to the datalake could indicate that the company operates in the furniture industry and the company's website might confirm this fact and specify that the company is a distributor. The statistical analysis may, for example, comprise calculating the frequency of occurrence for specialized and technical (referred to herein as "rare") n-grams, an n-gram being a contiguous sequence of n items from a given sample of text or speech. Machine learning may be used to find classification rules from given rare n-gram count percentages to define features. As used herein, the term machine learning refers to any suitable computer-based algorithm that can learn from data and make data-driven predictions or decisions, by building a model from sample inputs. Machine learning techniques referred to herein include, but not limited to, decision tree learning, association rule learning, support vector machines, cluster analysis (unsupervised learning), and reinforcement leearning. It should however be understood that other suitable techniques may apply.

Once the input data has been analyzed and the features of interest inferred, insights can be generated in real-time for the case at hand (step 204). Step 204 may comprise generating (and outputting to the user) recommendations as to actions to be taken and/or problems to solve in order to optimize the supply chain entity's supply chain. For example, the insights may be indicative of one or more aspects of the supply chain that should be improved. These aspects include, but are not limited to, logistics (e.g. managing transportation, warehousing, and inventory-stocking activities), production management or planning, inventory management, and demand forecasting (e.g. predicting future demand for products sold by a given company). For example, the content of the datalake might suggest (e.g. from the headers in the files stored in the datalake) that demand planning or product segmentation should be performed. The insights may be generated at step 204 as instructions to perform one or more actions with regards to a given project.

The insights may be generated by correlating the input data with existing projects (e.g. already solved optimization problems) stored in memory. If existing project(s) match the input data, the user-specific decision problem(s) to be solved can be readily determined and recommendations may be made based on the existing project(s) (e.g. recommendations to implement similar actions and/or plans as in the existing project(s)). If no existing project(s) match the input data, step 204 may comprise correlating the input data with existing documentation (e.g. academic papers, white papers, and other publicly available documentation related to supply chain optimization collected by the inference engine) in order to determine the user-specific decision problem(s) to be solved. When the output of the correlation process readily provides an indication of the user-specific problem(s), recommendations may be made accordingly.

In one embodiment, when the correlation process performed at step 204 does not allow to accurately determine (e.g. with a given level of certainty) the user-specific problem(s) to be solved, a conversational user interface is used to narrow-down the problem(s). For this purpose, the next step 206 is to automatically determine optimization parameters (referred to herein as additional or remaining parameters), if any, not explicitly provided by the user (e.g. in the request received at step 102 and/or the input data collected at step 104). In particular, if model building requires a given number of questions to be answered by the user in order to gather optimization parameters or constraints, the inference procedure performed at step 202 may allow to infer most (if not all) of these parameters. The remaining parameters (e.g. those which could not be inferred), if any, may then be determined at step 206.

A reduced set of questions to be answered by the user in order to collect the remaining parameters is then automatically determined at step 208. A conversational user interface is then used at step 210 to query the user with the reduced set of questions and collect the additional parameters. The querying and collecting steps 210 may be performed in real-time by an active computer program configured to perform high-level business functions (also referred to herein as an agent). The questions may be determined using machine learning techniques, where the agent learns over time in order to infer the minimal set of questions needed to perform the analysis, based on the available data.

In one embodiment, upon answers being received via the conversational interface (e.g. natural language input being received at the agent in real-time after the user is prompted to answer the reduced set of questions), the information gathered from the answers is parsed in real-time at step 210. The agent may be configured to use machine learning techniques to parse the answers correctly, based on an understanding of the answers and of their context. For this purpose, the agent may include an input decoder (e.g., an automatic speech recognizer) configured to convert the natural language input into plain text and a Natural Language Understanding (NLU) unit (which may include a parser unit) configured to analyze the text. Once the information is parsed, further explanations and/or suggestions (e.g. based on the predictive classification model discussed above) may be provided (e.g. by the agent) at step 210 when it appears that the user is not confident in their answer and/or the remaining parameters cannot be readily collected.

For example, at step 210, the following dialogue-flow between the agent and a user may take place (via the conversational user interface) regarding inventory constraints:

Agent: "I noticed that you have not entered a maintenance cost for your inventory. Is it that a) you do not have any; b) you have difficulty estimating the cost; c) you do not know what the inventory maintenance cost is?"
User: "I do not have any. I am renting out two warehouses where I can store what I want with no cost constraint."
Agent: "Are there any other constraints, for instance capacity-, area-, or volume-based constraints?"
User: "I am limited to 1000 m³ in both warehouses."

Based on the dialogue with the user, the agent can understand that there are two inventories and that each inventory limited to 1000 m³, i.e. subject to the following mathematical constraint, which is then taken into account in the analysis:

$$\sum_{i=1}^{N} Vol(item_i) \leq 1000 \text{ m}^3 \qquad (1)$$

It should be understood that the example described above and mathematical constraint (1) are merely illustrative. Other embodiments may apply depending on the entity for which supply chain operations are to be managed and optimized.

Once all necessary optimization parameters (e.g. constraints) have been collected, the optimization model(s) applicable to solve the specific decision problem of the user is established and the problem solved at step 108.

Figure 3:
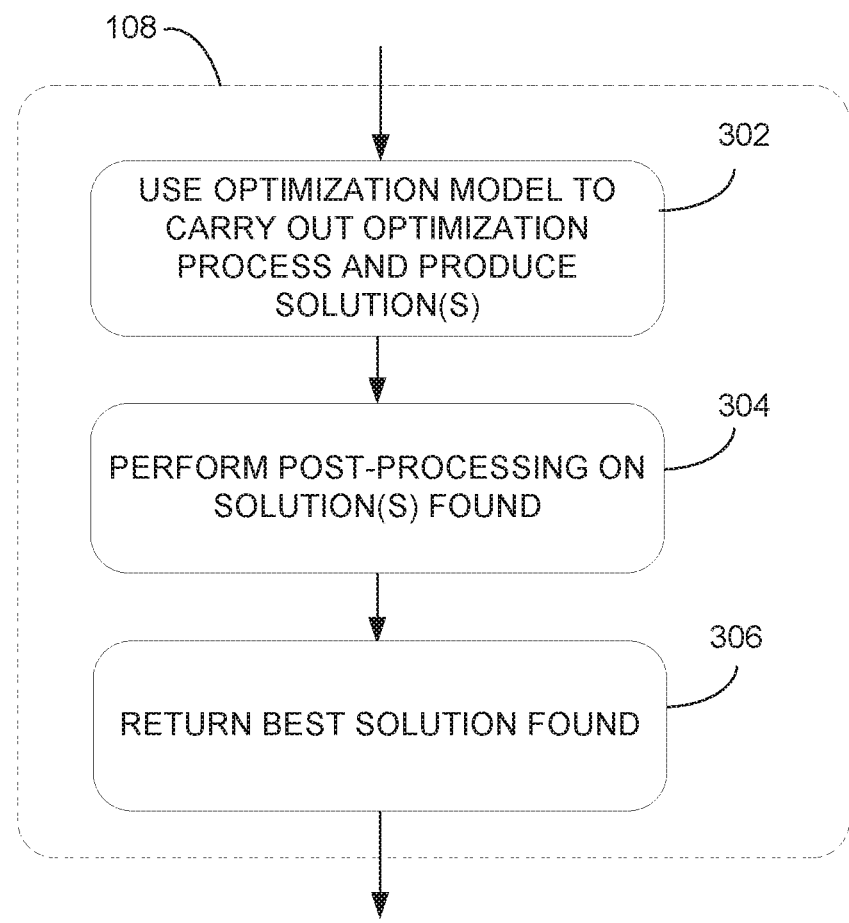
FIG. 3 is a flowchart of the step of FIG. 1 of outputting a solution to a user-specific decision problem using the optimization model.

Referring to FIG. 3, in one embodiment, the step 108 of outputting a solution to a user-specific decision problem comprises carrying out the optimization process using the optimization model and producing one or more solutions (step 302), performing post-processing on the solution(s) found (step 304), and returning the best solution (or optimum) found (step 306). In one embodiment, the step 304 of performing post-processing on the solution(s) comprises validating the results of the optimization process for self-consistency. Step 304 may also comprise performing parameter sensitivity, for example determining how much revenues change if a variable is slightly moved away from the computed optimum. In addition, step 304 may comprise annotating and justifying (e.g. discriminating based on mean squared error) the optimization methods used to find the solution(s). The best solution found (e.g. optimal purchase orders for various Stock Keeping Units (SKUs)) may then be returned at step 306 using any suitable means. In one embodiment, the best solution found is rendered on a suitable output device (e.g. a computer screen or other suitable display) using infographics (e.g. charts identifying salient features of the analysis). The results of the analysis can also be exported at step 306 using any suitable computer file format (e.g. CSV, JavaScript Object Notation (JSON), or the like), or directly fed to an ERP system via API calls.

Figure 4:
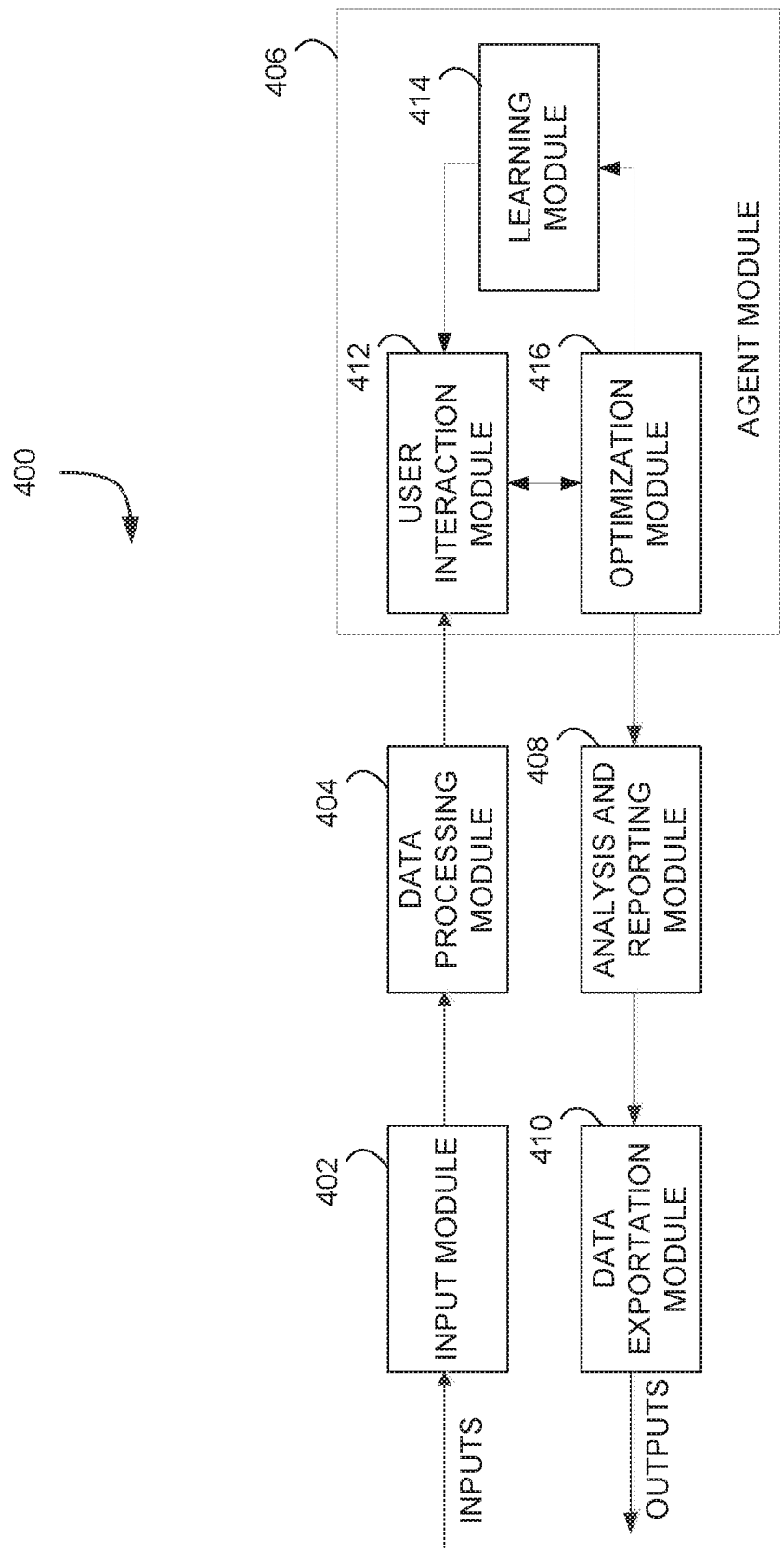
FIG. 4 is a block diagram of a system for supply chain optimization, in accordance with an illustrative embodiment.

Referring now to FIG. 4, a system 400 for supply chain optimization in accordance with one embodiment will now be described. The system 400 comprises an input module 402, a data processing module 404, an agent module 406, an analysis and reporting module 408, and a data exportation module 410. The agent module 406 illustratively comprises a user interaction module 412, a learning module 414, and an optimization module 416. The system 400 is configured to implement the methods described herein in reference to FIG. 1, FIG. 2, and FIG. 3.

In particular, the input module 402 illustratively receives inputs including a request from a user to perform supply chain optimization. The input module 402 is further configured to collect in real-time input data comprising data uniquely identifying the user as well as data relevant to the supply chain to be optimized. For this purpose, the input module 402 is configured to connect to and retrieve the data from a data storage (e.g. a datalake to which the data is uploaded by a user). The input module 402 is also configured to connect in real-time to a variety of systems, including, but not limited to, ERP systems, financial systems, e-commerce systems, ticket support systems, and email systems (as discussed herein above), in order to collect the input data. In addition, the input module 402 may be configured to crawl company webpages in real time to gather the input data. The input data is then sent to the data processing module 404, which processes and validates the input data. The processed data may be stored and made accessible to the agent module 406.

The agent module 406 is then configured to access the properly formatted input data (e.g. received from the data processing module 404 or retrieved from storage) and to dynamically build the optimization model in real-time. For this purpose, the user interaction module 412 uses a conversational approach to interact with the user and collect relevant optimization parameters (e.g. setup, holding costs, and other constraints), as discussed above. The optimization module 416 (which may comprise an inference engine, not shown) is configured to ensure that all parameters necessary to perform the optimization have been gathered and set. If this is not the case, the user interaction module 412 determines additional questions to be asked to the user, collects answers, and dynamically parses the answers to extract the missing parameters. The learning module 414 is used to implement one or more machine learning techniques, as discussed above, to allow the agent module 406 to learn from the user interactions in order to determine a minimal set of questions, explanations, and/or suggestions to be presented to the user as well as to correctly parse the answers and gather optimization parameters, based on an understanding of natural language and context.

In one embodiment, cloud computing is used to perform the methods described herein. In one embodiment, the computation is performed in Central Processing Unit (CPU), e.g. for heuristic methods, linear/dynamic programming. In another embodiments, the computation is performed in Graphics Processing Unit (GPU), e.g. for non-deterministic polynomial-time (NP) hard problems, reinforcement learning, genetic algorithms. The GPU computations might involve auto-calibration of parameters, load balancing for parallelization, and the like.

In one embodiment, once the optimization model applicable to the case at hand has been found, a cloud server is deployed and reserved using a suitable container-orchestration system, such as Kubernetes, and suitable container tool(s), such as Docker. A Docker file containing the optimization parameters is illustratively created and used to deploy a server instance. In other embodiments, the server instance may be deployed on a virtual machine having an auto-scaling feature may be used. The server instance then returns an API that can be used to initiate the optimization process and compute the solution to the user-specific decision problem.

Once the optimization model and relevant parameters have been set, the analysis and reporting module 408 is used to perform a number of functions, such as validating the results for self-consistency, perform parameter sensitivity analysis and annotating and justifying the optimization methods before reporting the findings using any suitable output means (e.g. infographics rendered on a suitable output device). The data exportation module 410 may also be used to export the analysis results or feed them directly to an ERP system.

Figure 5:
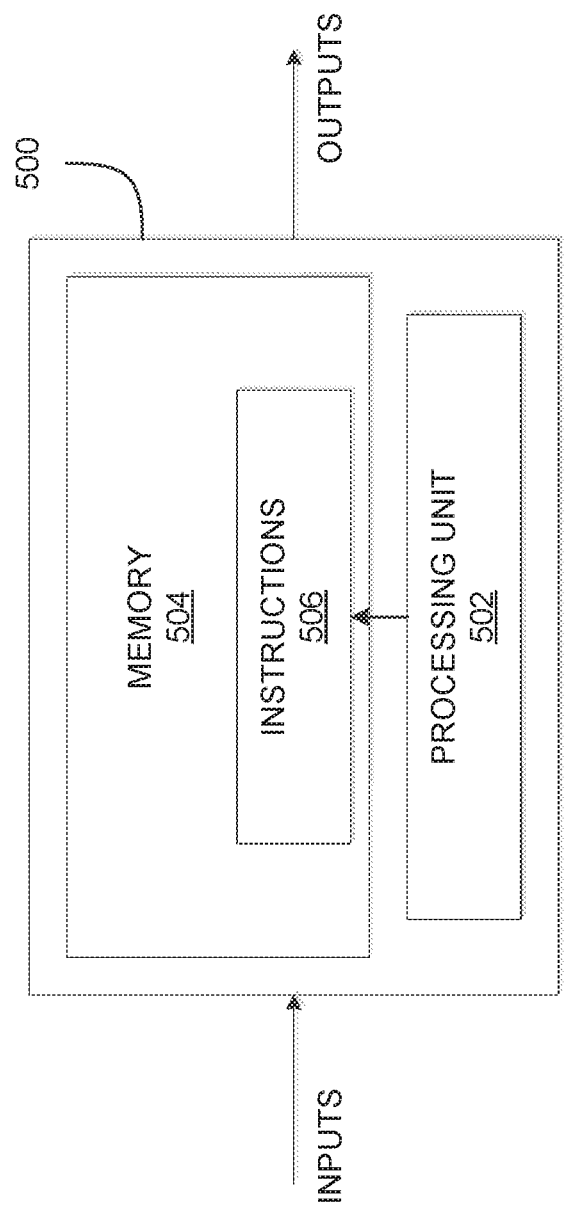
FIG. 5 is a block diagram of an example computing device for implementing the method of FIG. 1 and/or the system of FIG. 4.

FIG. 5 is an example embodiment of a computing device 500 that may be used to implement the systems and methods described herein (e.g. the method 100 and/or at least parts of the system 400). The computing device 500 comprises a processing unit 502 and a memory 504 which has stored therein computer-executable instructions 506. The processing unit 502 may comprise any suitable devices configured to cause a series of steps to be performed such that instructions 506, when executed by the computing device 500 or other programmable apparatus, may cause the functions/acts/steps specified in the methods described herein to be executed. The processing unit 502 (as well as any other processing unit or processor described herein) may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

It should be noted that the present invention can be carried out as a method, can be embodied in a system or on a computer readable medium. The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A computer-implemented method for optimizing a supply chain for at least one supply chain entity, the method comprising:
    collecting in real-time, by a computer system, input data related to the supply chain to be optimized;
    using an inference engine of the computer system to infer in real-time, from the input data, a decision problem to be solved to optimize the supply chain and one or more supply chain parameters to be optimized for the at least one supply chain entity;
    correlating, by the computer system, the input data with one or more previously-solved optimization problems stored in memory;
    responsive to determining that none of the one or more previously-solved optimization problems match the input data, using a conversational user interface of the computer system to query a user in real-time in order to gather one or more additional supply chain parameters to be optimized for the at least one supply chain entity;
    receiving in real-time, via the conversational user interface, a natural language input in response to the query;
    parsing, by the computer system, the natural language input in real-time to gather the one or more one or more additional supply chain parameters; and
    outputting, by the computer system, based on the one or more additional supply chain parameters, a solution to the decision problem.

2. The method of claim 1, wherein collecting the input data in real-time comprises connecting in real-time to at least one of an Enterprise Resource Planning (ERP) system, a financial system, an e-commerce system, a ticket support system, and an email system associated with the at least one supply chain entity, and automatically collecting the input data therefrom in real-time.

3. The method of claim 1, wherein collecting the input data in real-time comprises crawling a plurality of webpages in real-time to collect one or more of an identification of the at least one supply chain entity, a geographic region the at least one supply chain entity operates in, a website of the at least one supply chain entity, an industry the at least one supply chain entity operates in, and a sector the at least one supply chain entity operates in.

4. The method of claim 1, wherein using the inference engine to infer the one or more supply chain parameters comprises using the inference engine to perform a statistical analysis of textual content contained in the input data to infer one or more features relevant to the supply chain to be optimized, and determine the one or more supply chain parameters from the one or more features.

5. The method of claim 1, further comprising using the computer system to:
use machine learning techniques to determine a reduced set of questions to be answered by the user to collect one or more additional supply chain parameters that failed to be inferred from the input data; and
use the conversational user interface to query the user with the reduced set of questions in real-time in order to gather the one or more additional supply chain parameters.

6. The method of claim 1, further comprising using the computer system to:
establish in real-time, based on the input data, the one or more supply chain parameters, and the one or more additional supply chain parameters, at least one optimization model applicable to solve the decision problem; and
carry out an optimization process using the at least one optimization model to generate the solution to the decision problem.

7. The method of claim 6, further comprising using the computer system to perform post-processing on the solution by at least one of validating results of the optimization process for self-consistency, performing parameter sensitivity, and annotating and justifying the optimization process.

8. The method of claim 1, wherein outputting the solution comprises feeding the solution to an Enterprise Resource Planning (ERP) system via one or more Application programming interface (API) calls.

9. A system for optimizing a supply chain for at least one supply chain entity, the system comprising:
a processing unit; and
a non-transitory computer-readable memory having stored thereon program instructions executable by the processing unit for:
collecting, in real-time, input data related to the supply chain to be optimized,
inferring in real-time, from the input data, a decision problem to be solved to optimize the supply chain and one or more supply chain parameters to be optimized for the at least one supply chain entity,
correlating, by the computer system, the input data with one or more previously-solved optimization problems stored in memory;
responsive to determining that none of the one or more previously-solved optimization problems match the input data, using a conversational user interface to query a user in real-time in order to gather one or more additional supply chain to be optimized for the at least one supply chain entity,
receiving in real-time, via the conversational user interface, a natural language input in response to the query,
parsing the natural language input in real-time to gather the one or more one or more additional supply chain parameters, and
outputting, based on the one or more additional supply chain parameters, a solution to the decision problem.

10. The system of claim 9, wherein the program instructions are executable by the processing unit for collecting the input data in real-time comprising connecting in real-time to at least one of an Enterprise Resource Planning (ERP) system, a financial system, an e-commerce system, a ticket support system, and an email system associated with the at least one supply chain entity, and automatically collecting the input data therefrom in real-time.

11. The system of claim 9, wherein the program instructions are executable by the processing unit for collecting the input data in real-time comprising crawling a plurality of webpages in real-time to collect one or more of an identification of the at least one supply chain entity, a geographic region the at least one supply chain entity operates in, a website of the at least one supply chain entity, an industry the at least one supply chain entity operates in, and a sector the at least one supply chain entity operates in.

12. The system of claim 9, wherein the program instructions are executable by the processing unit for using the inference engine to infer the one or more supply chain parameters comprising using the inference engine to perform a statistical analysis of textual content contained in the input data to infer one or more features relevant to the supply chain to be optimized, and determine the one or more supply chain parameters from the one or more features.

13. The system of claim 9, wherein the program instructions are executable by the processing unit for:
using machine learning techniques to determine a reduced set of questions to be answered by the user to collect one or more additional supply chain parameters that failed to be inferred from the input data; and
using the conversational user interface to query the user with the reduced set of questions in real-time in order to gather the one or more additional supply chain parameters.

14. The system of claim 9, wherein the program instructions are executable by the processing unit for:
establishing in real-time, based on the input data, the one or more supply chain parameters, and the one or more additional supply chain parameters, at least one optimization model applicable to solve the decision problem; and
carrying out an optimization process using the at least one optimization model to generate the solution to the decision problem.

15. The system of claim 14, the program instructions are executable by the processing unit for performing post-processing on the solution by at least one of validating results of the optimization process for self-consistency, performing parameter sensitivity, and annotating and justifying the optimization process.

16. The system of claim 9, wherein the program instructions are executable by the processing unit for outputting the solution comprising feeding the solution to an Enterprise Resource Planning (ERP) system via one or more Application programming interface (API) calls.

17. A non-transitory computer readable medium having stored thereon program code executable by a processor for optimizing a supply chain for at least one supply chain entity, the program code comprising instructions for:
- collecting, in real-time, input data related to the supply chain to be optimized;
- inferring in real-time, from the input data, a decision problem to be solved to optimize the supply chain and one or more supply chain parameters to be optimized for the at least one supply chain entity;
- correlating, by the computer system, the input data with one or more previously-solved optimization problems stored in memory;
- responsive to determining that none of the one or more previously-solved optimization problems match the input data, using a conversational user interface to query a user in real-time in order to gather one or more additional supply chain parameters in real-time to be optimized for the at least one supply chain entity;
- receiving in real-time, via the conversational user interface, a natural language input in response to the query;
- parsing the natural language input in real-time to gather the one or more one or more additional supply chain parameters; and
- outputting, based on the one or more additional supply chain parameters, a solution to the decision problem.

* * * * *